United States Patent [19]

Kamiya

[11] Patent Number: 4,778,022
[45] Date of Patent: Oct. 18, 1988

[54] ELECTRIC POWER STEERING SYSTEM

[75] Inventor: Akihide Kamiya, Anjo, Japan

[73] Assignee: Aisin Seiki Kabushiki Kaisha, Kariya, Japan

[21] Appl. No.: 25,632

[22] Filed: Mar. 13, 1987

[30] Foreign Application Priority Data

Mar. 13, 1986 [JP] Japan .................................. 61-55689

[51] Int. Cl.⁴ .............................................. B62D 5/04
[52] U.S. Cl. .................................. 180/79.1; 73/862.35
[58] Field of Search ...................... 180/79.1, 141, 142, 180/143; 73/708, 862.33, 862.35

[56] References Cited

U.S. PATENT DOCUMENTS

| | | | |
|---|---|---|---|
| 3,683,685 | 8/1972 | Viegelahn | 73/862.35 X |
| 3,910,106 | 10/1975 | Brady | 73/708 |
| 4,574,903 | 3/1986 | Hashimoto et al. | |
| 4,621,701 | 11/1986 | Takabayashi et al. | |
| 4,645,024 | 2/1987 | Takabayashi | |
| 4,676,331 | 6/1987 | Iwaki et al. | 73/862.33 X |
| 4,724,711 | 2/1988 | Sakakibara et al. | 180/79.1 X |

FOREIGN PATENT DOCUMENTS

| | | | |
|---|---|---|---|
| 58-133957 | 8/1983 | Japan | 180/79.1 |
| 58-177773 | 10/1983 | Japan | 180/79.1 |
| 58-194664 | 11/1983 | Japan | 180/79.1 |
| 59-227560 | 12/1984 | Japan | |
| 60-25853 | 2/1985 | Japan | |

Primary Examiner—John J. Love
Assistant Examiner—Charles R. Watts
Attorney, Agent, or Firm—Burns, Doane, Swecker & Mathis

[57] ABSTRACT

Herein disclosed is an electric power steering system which comprises: a detecting unit for detecting the direction and magnitude of a relative angular displacement betweeen input and output shafts; and an electric motor connected to the output shaft and having its revolutions controlled through a controller in accordance with the output signal of the detecting unit. The detecting unit includes a converting mechanism for converting the relative angular displacement into an axial displacement, and a displacement detecting unit for detecting the magnitude of the displacement in the axial direction. The displacement detecting unit can have its neutral position adjusted independently of other parts.

3 Claims, 2 Drawing Sheets

ELECTRIC POWER STEERING SYSTEM

BACKGROUND OF THE INVENTION

1. Field of the Invention

The present invention relates to an electric power steering system entrusting a steering power to the drive of an electric motor.

2. Description of the Prior Art

The system of this kind according to the prior art is exemplified, as shown in FIG. 4, by the system proposed by Japanese Patent Laid-Open No. 227560/1984.

This system will be summarized with regard to the use of the system on a detecting unit for detecting the turning direction and steering force of a steering shaft. A steering shaft 36 and a worm shaft 33 are coupled to the two ends of a torsion bar 37 by means of pins $P_1$ and $P_2$, respectively. To the leading end of the steering shaft 36, there is fixed a slider 41 contacting with a sliding resistor 40, both of which constitute a sensor 42 for detecting the turning direction and steering force of the steering shaft 36. Incidentally, reference numeral 31 denotes a steering gear box, in which are accommodated the worm shaft 33, a ball nut 32 threaded on the worm shaft 33 through steel balls 34, a sector shaft 35 having a pinion 35a meshing with a rack 32a formed on one side face of the ball nut 32, and the aforementioned sensor 42. In one end face of the steering gear box 31, on the other hand, there is formed a hole, through which extends one end of the worm shaft 33 connected to an electric motor 39 through a reduction gear mechanism 38.

Now, if the not-shown steering wheel is actuated to turn the steering shaft 36, the torsion bar 37 is twisted to displace the slider 41 from its initial position with respect to the sliding resistor 40. The sensor 42 outputs a change in the resistance as an output $S_1$ to a controller 43. In response to this signal $S_1$ and a signal $S_2$ from a vehicular speed sensor 44, the controller 43 outputs a drive signal $S_3$ to the electric motor 39. Then, this electric motor 39 revolves while having its turning direction and force controlled by the drive signal $S_3$ to generate a steer assisting force.

Incidentally, in the power steering system of the type in which the steering force and the turning direction are detected in terms of the torsion of the torsion bar, the so-called "centering operation" is required for strictly adjusting the neutral position so as to warrant the transverse symmetry of the characteristics. Especially in the electric power steering system, it is important to adjust the output signal level of the sensor in the neutral position to the reference level of the input signal of the controller.

In this electric power steering system of the prior art including the aforementioned system, the sensor is made integral with the constructional components such as the steering shaft or the gear so that the aforementioned centering operation is large-scaled and it is required to have highly precise machining, thus causing a rise in the production cost.

In order to solve these problems, it is conceivable to rough the centering operation of the sensor so that the reference level of the input signal at the side of the controller may be adjusted to the output signal level in the neutral state of the sensor. In this case, the interchangeability of the controller is lost thus making it necessary to handle the sensor and the controller always in a pair. This raises a demerit of losing the interchangeability from the controller. Therefore, this concept cannot be adopted at all.

Thus, the electric power steering system of the existing type, in which the turning force and direction of the input/output shafts are detected to control the revolutions of the electric motor by making use of the relative revolutions of them, is accompanied by the problem that, since the components of the steering gear and the sensor are integrated, the centering operation of the sensor unit is large-scaled and required to have the highly precise machining.

SUMMARY OF THE INVENTION

The present invention has been developed so as to solve these problems and has an object to provide an electric power steering system which is enabled to make a centering adjustment only through the sensor by separating a portion of the detection unit from the components such as the steering gear.

In order to achieve this object, according to the present invention, there is provided an electric power steering system comprising: an input shaft connected to a steering wheel; an output shaft connected to a steering gear; detecting means for detecting the magnitude and direction of a relative angular displacement between said input shaft and said output shaft; an electric motor connected to said output shaft; and control means for controlling the revolutions of said electric motor in accordance with the output signal of said detecting means, wherein the improvement comprises: said detecting means including a converting mechanism for converting the relative angular displacement between said input and output shafts into an axial displacement and displacement detecting means for detecting the magnitude and direction of said axial displacement; and an adjusting mechanism for solely adjusting the neutral position of said displacement detecting means.

The detecting means is made independent of the components such as the steering gear and used to adjust the neutral position. This makes it unnecessary to attach and detach the aforementioned individual components for the adjustment and to adjust the controller.

BRIEF DESCRIPTION OF THE DRAWINGS

Other objects, features and advantages of the present invention will become apparent from the following description taken with reference to the accompanying drawings, in which.

DESCRIPTION OF THE PREFERRED EMBODIMENT

Figure 1:
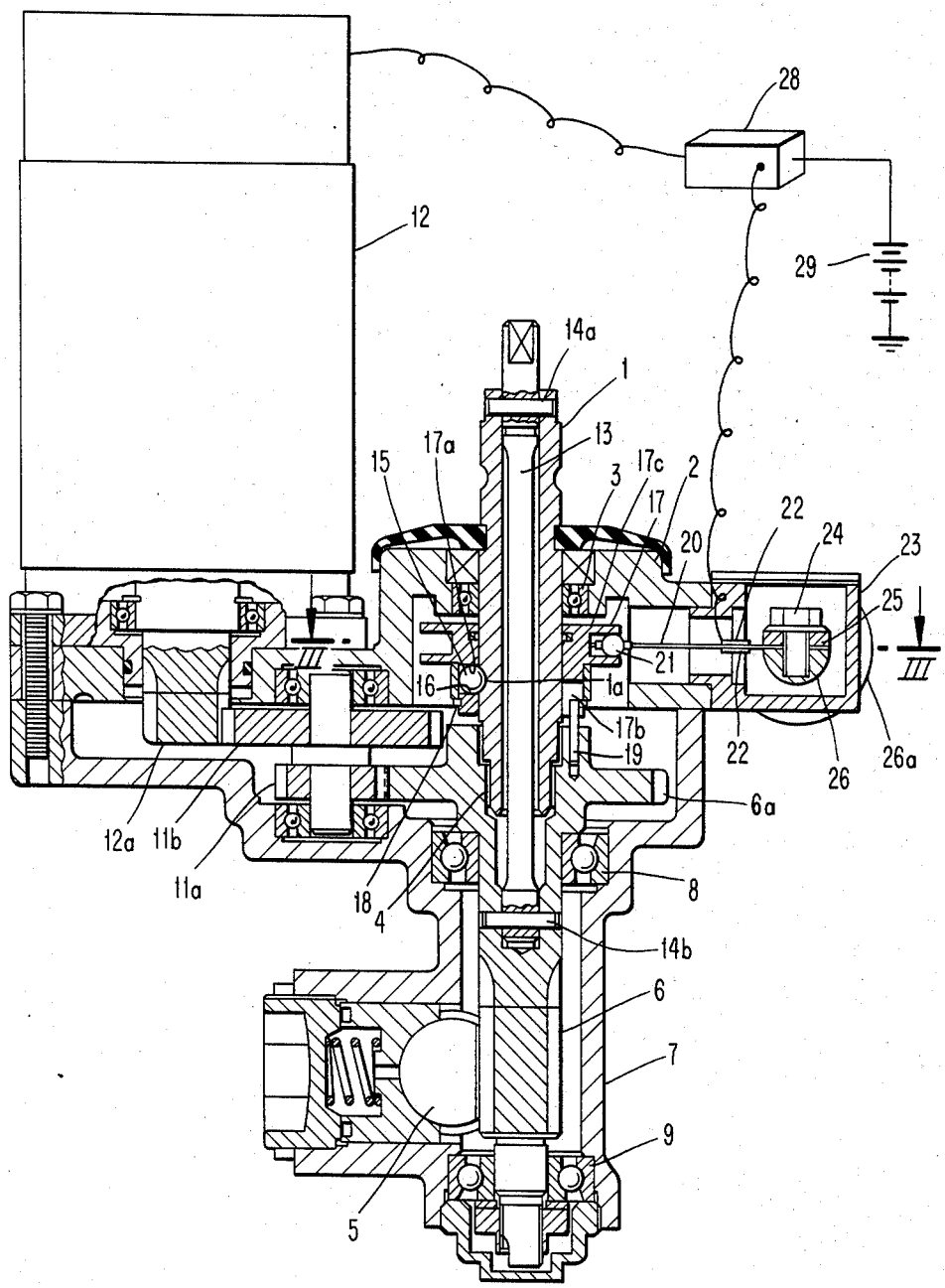
FIG. 1 is a sectional view showing the overall construction of the electric power steering system according to one embodiment of the present invention.
Figure 2:
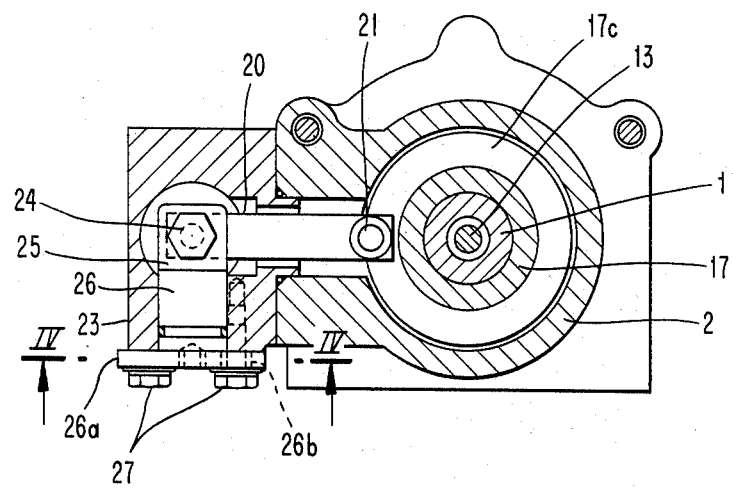
FIG. 2 is a section taken in the direction of arrows III—III of FIG. 1.
Figure 3A:
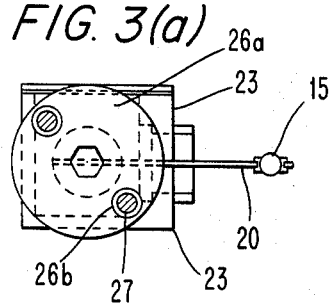
FIGS. 3(a) and 3(b) are views taken in the direction of arrows IV—IV of FIG. 2 and show the state having the lever positioned at the center and the adjusting range of the lever, respectively.
Figure 3B:
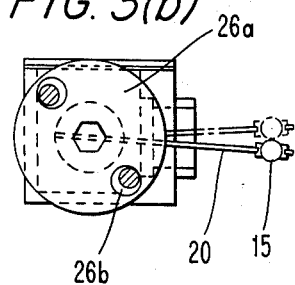
Figure 4:
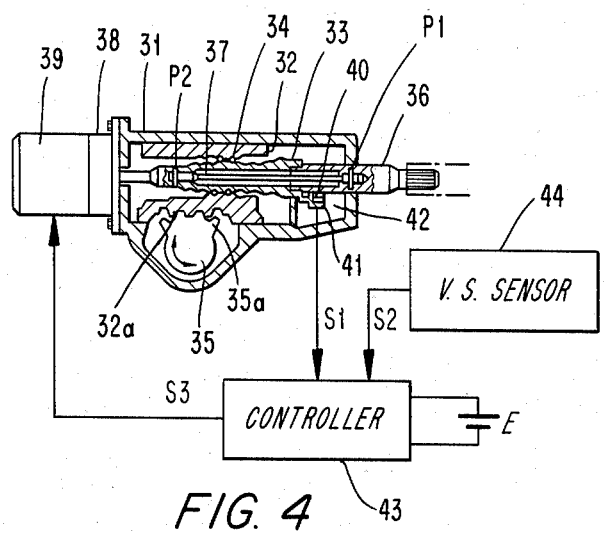
FIG. 4 is a sectional view showing the essential portion of the ball-screw type electric power steering system of the prior art.

The present invention will be described in the following in connection with the embodiment thereof with reference to the accompanying drawings. In FIGS. 1 to 3 showing the embodiment of the present invention:

FIG. 1 shows the overall construction of the electric power steering system; FIG. 2 is a section showing the detection unit of the same system and taken from the front; and FIGS. 3(a) and 3(b) show a portion of the same detection unit in a side view before the centering adjusting and the range of the adjustment, respectively.

First of all, the overall construction of the system of the present embodiment will be described with reference to FIG. 1.

In FIG. 1, reference numeral 1 denotes an input shaft which has its one end connected to a (not-shown) steering wheel through a steering shaft and which is integrated with a pinion shaft 6 through a torsion bar 13. More specifically, the input shaft 1 and the pinion shaft 6 are coupled to the torsion bar 13 through pins 14a and 14b, respectively. The input shaft 1 has its steering wheel side borne by a bearing 3 press-fitted in an upper housing 2 and its other end borne by a bearing 4 press-fitted in the cylindrical inner face of one end of the pinion shaft 6. On the other hand, the pinion shaft 6 is borne without any axial play by a pair of angular ball bearings 8 and 9 which are fitted in a lower housing 7.

The pinion shaft 6 has its leading end formed with a pinion gear meshing with a rack 5 for steering the wheels. The pinion shaft 6 is formed on the outer circumference at the engagement side of the input shaft 1 with a larger-diameter spur gear which meshes with a gear 12a at the leading end of the output shaft of an electric motor 12 through intermediate gears 11a and 11b to construct a reduction gear mechanism.

On the other hand, the input shaft 1 is formed in the vicinity of its center portion with a helical groove 1a which engages with a ball 15 fitted in a hole 17a formed in a cylindrical slider 17. This slider 17 is fitted loosely on the input shaft 1 and formed with a flange at its portion.

The slider 17 is formed in the outer circumference of the aforementioned flange with an annular groove 17c extending in the circumferential direction thereof and in the end face facing the aforementioned pinion shaft 6 with an elongated groove 17b, which engages with a pin 19 press-fitted in the end face of the pinion shaft 6 to allow the slider 17 to move in the axial direction of the input shaft 1 and to revolve with the turns of the pinion shaft 6. Incidentally, reference numeral 16 denotes an annular member to be fitted on the outer circumference of the cylindrical portion of the slider 17, and numeral 18 denotes an elastic ring for preventing the aforementioned annular member from coming out.

To a portion of the aforementioned upper housing 2, on the other hand, there is attached a casing 23 which has a removable cover on its upper face. In this case 23, there is fixedly held the other end of a lever 20 which is made of an elastic material having a leaf spring shape and which holds a ball 21 at its one end.

As shown in FIGS. 1 and 2, more specifically, the casing 23 has its one side fixed on the upper housing 2. The aforementioned lever 20 is inserted into the opening of the fixed side face of the casing 23 such that its plane face is in parallel with the groove side face of the annular groove 17c of the slider 17. The other end of the lever 20 is fixed to the end of an adjusting shaft 26 at a right angle through a washer 25 by means of a bolt 24. This adjusting shaft 26 is partially formed with a face in parallel with the plane face of the lever 20.

The adjusting shaft 26 is formed at its outer end with a flange 26a which forms one side face of the aforementioned casing 23. This flange 26a is formed with two holes 26b, as shown in FIG. 3. These holes 26b provide not only holes through which bolts 27 are screwed to fasten the flange 26a to the casing 23 but also holes for adjusting the position of the lever 20, as will be described later. For these purposes, the holes 26b are made slightly larger than the diameter of the bolts 27 to retain a predetermined clearance around the bolts 27.

The ball 21 retained in one end of the aforementioned lever 20 is fitted in the annular groove 17c of the slider 17. To the lever, on the other hand, there is fixedly adhered a strain gauge 22 which is electrically connected with a controller 28. In response to a signal outputted from the strain gauge 22, the controller 28 supplies an electric current from a battery 29 to the electric motor 12.

The operations of the system thus constructed according to the present embodiment will be described in the following. Now, in the neutral state, i.e., when no steering force is applied to the (not-shown) steering wheel, no deflection occurs in the lever 20 so that the output of the strain gauge 22 is zero. As a result, the controller 28 shuts off the connection between the battery 29 and the electric motor 12 so that the electric motor 12 receives no current and remains inoperative.

Here, if a clockwise steering torque, for example, is applied to the steering wheel, the input shaft 1 turns clockwise relative to the pinion shaft 6 because the torsion bar 13 having its two ends coupled to the input shaft 1 and the pinion shaft 6 is given not only a function to transmit the manual steering torque from the steering wheel to the pinion shaft 6 but also a torque-displacement converting function to generate a relative torsion proportional to the input torque between the input shaft 1 and the pinion shaft 6 from the torque (i.e., the input torque) applied to the input shaft.

Now, since the slider 17 fitted on the outer circumference of the input shaft 1 turns integrally and in the same direction with the pinion shaft 6 because it engages with the pin 19 projecting axially from the end portion of the pinion shaft 6 so that the input shaft 1 also displaces clockwise relative to the slider 17 like to the pinion shaft 6.

As a result of this relative displacement between the input shaft 1 and the slider 17, the helical groove 1a formed in the outer circumference of the input shaft 1 pushes up the ball 15 fitted in the hole 17a of the slider 17, and the ball 15 in turn raises and displaces the slider 17 upward (toward the steering wheel) relative to the input shaft 1.

Here, since the input shaft 1 is fixed in the axial direction, the slider 17 displaces upward in the axial direction of the input shaft 1 relative to the upper and lower housings 2 and 7.

On the other hand, the lever 20 has its one end fixed in a portion of the upper housing 2 through the adjusting shaft 26 and the casing 23. If the slider 17 displaces upward relative to the upper housing 2, as has been described above, the ball 21 retained in the other end of the lever 20 is raised by the annular groove 17c of the slider 17 to establish the upward deflection of the lever 20.

The strain gauge 22 adhered to the lever 20 detects the quantity and direction of the deflection of the lever 20 so that it outputs electric signals (in voltages) corresponding to the deflection magnitude (i.e., the magnitude of the steering torque) and direction (i.e., the direction of the steering torque) of the lever 20 to the controller 28. In response to the electric signals outputted from the strain gauge 22, the controller 28 controls the value and direction of the current flowing from the battery 29 to the electric motor 12 so that the electric motor 12 may be driven in a proper state to generate a clockwise assisting torque.

This assisting torque generated by the electric motor 12 is transmitted to the spur gear 6a of the pinion shaft 6 through the gear 12a and the intermediate gears 11a and 11b and is added to the manual steering torque transmitted through the torsion bar 13 thereby to steer the (not-shown) wheels rightward.

Next, the description to be made is directed to the case in which a leftward steering torque is applied to the steering wheel. Contrary to the rightward steer, the slider 17 is displaced downward (toward the pinion shaft 6) relative to the upper housing 2 by the relative torsion of the input shaft 1 and the pinion shaft 6 so that a downward deflection is generated in the lever 20.

In accordance with the magnitude of this deflection, the strain gauge 22 outputs an electric signal in a polarity opposed to that in the rightward steering case with respect to the reference level (i.e., the output signal level in the neutral state). As a result, the controller 28 feeds the electric motor 12 with a current in the direction opposite to that of the rightward steering case to drive the electric motor 12. The assisting torque generated by the electric motor 12 is transmitted to the pinion shaft and is added to the manual steering torque to steer the wheels leftward.

In the system thus operating, the displacement detecting mechanism unit of the slider 17 composed of the lever 20, the casing 23 and so on and the controller 28 are combined with the steering gear, after their parts have been adjusted and subjected to performance inspections, until they are subjected to a final performance inspection.

At the steps of adjusting and inspecting of each unit, more specifically, first of all for the displacement detecting mechanism unit, the lever 20 is fixed by the bolt 24 and the washer 25 to the adjusting shaft 26 which has been temporarily fastened to the casing 23 by the bolts 27, and the adjustment of the reference level and the confirmation and adjustment of the output signal level relative to the magnitude of deflection of the lever 20 are then conducted. For the controller 28, on the other hand, the transverse symmetry and the gain of a simulation input signal are adjusted and inspected.

The system having its units adjusted and inspected is combined with the steering gear so that it may be subjected to the final performance inspection.

If, at the stage of the final performance inspection, a deflection occurs in the lever 20 when in the neutral state in which no steering torque is applied to the input shaft 1, the reference level of the output signal of the strain gauge 22 deviates from the value for the unit adjustment to lose the transverse symmetry of the control characteristics of the controller 28 so that a readjustment is required.

In this case, the system of the prior art would require a large-scaled adjustment. If the defect should be discovered after the system has been shipped to the market, the system might have to be replaced as a whole in the worst case. If the serviceability in the market is thus taken into consideration, it is not economical to replace the whole system if the system is partially defective but rather, it is recommended to sufficiently consider the interchangeability of each component. In this case, too, it is thought highly difficult from technical points and quality assurance to adjust the complicated electric characteristics in the market. It is therefore necessary that the minimum adjustment be sufficient.

The present invention is conceived by considering these points in addition to the problems discussed in the description of the prior art, and the points have also been considered in the present embodiment.

In the present embodiment, more specifically, in order that the magnitude of the deflection of the lever 20 may be reduced to zero while the reference level of the output signal of the strain gauge 22 is being maintained when the reference level is found to deviate at the aforementioned final stage of the performance inspection, the displacement detecting mechanism unit of the slider 17 is assembled with and fixed in the upper housing 2 such that the ball 21 retained on the leading end of the lever 20 is fitted in the annular groove 17c of the slider 17. Then, the strain gauge 22 and the controller 28 are connected, and the controller 28, the power source and the electric motor 12 are connected by the electric wiring.

After these connections, the adjusting shaft 26 for fixing the lever 20 is released by loosening the bolts 27 from its temporary fastened state to the casing 23. The output signal of the strain gauge 22 is branched and connected with a tester, and the adjusting shaft 26 is turned while the tester being observed to determined the reference level when the output level of the strain gauge 22 is zero.

The bolts 27 are fastened while the adjusting shaft 26 being held in that position to fix the adjusting shaft 26 in the casing 23, thus ending the adjustment.

This adjustment is naturally conducted before shipping of the vehicle but can be simply conducted, if necessary, by procedures similar to the aforementioned ones.

As has been described in detail hereinbefore, according to the present invention, the relative revolutions of the input/output shafts are converted into the axial displacement, and the displacement detecting unit for detecting the magnitude of the displacement is separated independently from the constructional parts of the steering gear so that its neutral position can be solely adjusted. As a result, the reference level of the displacement detecting unit in the neutral position can be simply adjusted without adversely affecting another system such as the controller.

Since, moreover, the displacement detecting unit can be detachably fixed in the housing or the like independently of other parts, it can be simply replaced of itself with the aforementioned simple adjusting function.

While this invention has been illustrated and described in accordance with a preferred embodiment, it is recognized that variations and changes may be made and equivalents employed herein without departing from the invention as set forth in the claims.

What is claimed is:

1. An electric power steering system comprising:
   a housing;
   an input shaft connected to a steering wheel and including an outer circumference formed with a helical groove therein;
   an output shaft connected to a steering gear;
   an electric motor connected to the output shaft;
   control means for controlling the revolutions of the electric motor in accordance with a relative angular displacement between the input shaft and the output shaft;

detecting means detachably mounted on said housing for detecting the magnitude and direction of the relative angular displacement between the input shaft and the output shaft, said detecting means including converting means for converting the relative angular displacement between the input and output shafts into an axial displacement, the converting means including a torsion bar having two ends, one of the ends being fixed to the input shaft and the other of the ends being fixed to the output shaft, a slider having an outer annular groove and a hole in its outer circumference, the slider being rotatably and axially movable relative to the input shaft but irrotatable relative to the output shaft, and a ball fitted in the hole of the slider and engaging the helical groove of the input shaft so that the slider is moved axially along the input shaft when the input shaft rotates relative to the slider, and displacement detecting means for detecting the direction and magnitude of the axial displacement of the slider, the displacement detecting means including a casing mounted on the housing, a lever formed of a leaf spring having two ends, one of the ends being held fixedly in the casing and the other of the ends being provided with a ball receivable in the annular groove of the slider, and a sensor carried on the lever; and adjustment means for adjusting the position of the lever relative to the input shaft, the adjustment means including an adjusting shaft fixedly supporting the one of the ends of the lever, the adjusting shaft being rotatably adjustable in the casing.

2. An electric power steering system according to claim 1, wherein said sensor is a strain gauge adhered fixedly to said lever.

3. An electric power steering system according to claim 1, wherein said control means is made operative to control the current to be fed to said electric motor in accordance with the output signal of said displacement detecting means.

* * * * *